United States Patent [19]

Taniguchi et al.

[11] Patent Number: 4,890,325

[45] Date of Patent: Dec. 26, 1989

[54] SPEECH CODING TRANSMISSION EQUIPMENT

[75] Inventors: Tomohiko Taniguchi, Wakayama; Kohei Iseda, Yokohama; Koji Okazaki, Kawasaki; Fumio Amano, Tokyo; Shigeyuki Unagami, Atsugi, all of Japan

[73] Assignee: Fujitsu Limited, Kawasaki, Japan

[21] Appl. No.: 156,882

[22] Filed: Feb. 18, 1988

[30] Foreign Application Priority Data

Feb. 20, 1987 [JP] Japan .................................. 62-037304

[51] Int. Cl.$^4$ .............................................. G10L 5/00
[52] U.S. Cl. ........................................ 381/34; 381/40
[58] Field of Search ........................ 381/29, 30, 34, 40

[56] References Cited

U.S. PATENT DOCUMENTS

| 4,475,227 | 10/1984 | Belfield | 381/30 |
| 4,550,425 | 10/1985 | Anderson et al. | 381/30 |
| 4,622,680 | 11/1986 | Zinser | 381/29 |

Primary Examiner—Emanuel S. Kemeny
Attorney, Agent, or Firm—Staas & Halsey

[57] ABSTRACT

Speech is data-compressed and coded for transmission using TDHC (Time Domain Harmonic Compression) for the voiced signal, and decimated sampling for the unvoiced signal. Features include voiced/unvoiced detection, pitch period detection, border detection, coding by ADPCM, and optimum quantization coding. Reception involves decoding and data-reconstruction.

6 Claims, 18 Drawing Sheets $$Sc(1) = \frac{S(1) + S(2)}{2}$$

$$\hat{S}(2) = \frac{\hat{S}c(1) + 3\hat{S}c(2)}{4}$$

$$\hat{S}(3) = \frac{3\hat{S}c(2) + \hat{S}c(3)}{4}$$

SPEECH CODING TRANSMISSION EQUIPMENT

BACKGROUND OF THE INVENTION (1) Field of the Invention

The present invention relates to a speech coding transmission equipment. More particularly, it relates to a time domain harmonic scaling (TDHS) type high efficiency speech coding transmission equipment wherein a time domain harmonic scaling is applied by utilizing a repetition of a speech signal at each pitch period.

(2) Description of the Related Art

TDHS is a coding system wherein bandwidth compression and expansion in a time domain is carried out by utilizing a periodical characteristic of a speech waveform at each pitch period. The TDHS is described in detail in publications (1) and (2) shown hereinafter, is summarized in publication (3), and an improvement thereof is disclosed in publication (4).

A high efficiency speech coding transmission equipment uses the TDHS system to compress and expand the speech signal in the time domain, and thus maintain the quality of the signal.

In the transmission of speech signal by, for example, a mobile communication, satellite communication, intra-company communication, or the like, the cost of communication must be made as low as possible, and, for the storage of speech data in, for example, a speech signal storage unit, speech response system, or the like, the memory capacity must be made as small as possible. The above high efficiency speech coding transmission apparatus should satisfy these requirements.

In a high efficiency speech coding transmission equipment using the TDHS, however, a problem arises in that, when decoding speech signal, the clarity of the unvoiced speech therein is often degraded, and accordingly, there is a growing demand for a speech coding transmission equipment in which this degradation of the quality of the speech signal as a whole is avoided.

Reference Publications:

(1) D. Malah, "Time-domain algorithms for harmonic bandwidth reduction and time scaling of speech signals", IEEE Trans. Acoust. Speech Signal Processing, vol. ASSP-27, pp. 121-133 Apr. 1979.

(2) R. V. Cox et al., "An Implementation of Time Domain Harmonic Scaling with Application to Speech Coding", ICC 82, pp. 4G. 1. 1-4.

(3) S. Furui, "Digital Speech Processing", pp. 122-124, Tokai Daigaku Shuppankai (Japanese language publication).

(4) Morita, Itakura, "A Compression and Expansion System in Time Domain for Speech Signals using a Self-correlative Method, and an Evaluation thereof" Electric Acoustic Research Committee Material EA 86-5 (Japanese language publication).

In a conventional TDHS, evaluation functions for an extraction of the periodical characteristic of speech signals are calculated by a waveform correlation using the following equation (1) or by a waveform similarity using the following equation (2), and the period having the strongest correlation is determined to be a pitch period.

$$S_1(N) = \Sigma X_j \cdot X_{j-N} / \Sigma X_j^2 \quad (1)$$

$$S_2(N) = \Sigma |X_j - X_{j-N}| \quad (2)$$

The extent of the search for the pitch period is defined between an upper limit and a lower limit of the pitch frequency. For example, the search is carried out to the extent of $16 \leq N \leq 200$.

However, an appropriate period cannot be extracted from unvoiced speech having no periodical characteristic by the above search methods. Therefore, since compression and expansion is carried out in accordance with a random pitch period, the characteristic of the waveform cannot be preserved, and therefore, the decoded speech signal is not clear, and thus a degradation of the quality of the transmission characteristics cannot be avoided.

The present invention intends to solve the above-mentioned problems in the conventional technology in this field.

SUMMARY OF THE INVENTION

An object of the present invention is to provide a speech coding transmission equipment wherein compression and expansion in a time domain harmonic scaling during the reception of unvoiced speech having no periodical characteristic are processed in accordance with a sampling period, and wherein the quality of the unvoiced speech in the decoded speech is improved and the clarity of the entire decoded speech can be increased.

In a first aspect of the present invention, there is provided a speech coding transmission equipment comprising a transmitting portion wherein the bandwidth of a speech signal is compressed and the signal is encoded and transmitted, and a receiving portion wherein the transmitted coded signal is decoded, the bandwidth of the decoded signal is expanded to the width before compression, and the speech signal is reproduced.

The transmitting portion comprises a voiced/unvoiced detection, a pitch period extraction, a time domain harmonic compression, and a decimation. The receiving portion comprises a time domain harmonic expansion and a interpolation.

The voiced/unvoiced detection distinguishes a period of voiced speech and a period of unvoiced speech in the speech signal. The voiced speech is generated when the characters A, E, I, O, U, M, N, R, B, D, G, etc., are pronounced. The unvoiced speech is generated when the characters S, H, P, T, K, etc., are pronounced.

The pitch period extraction unit extracts the pitch period of the speech signal during the period of voiced speech.

The time domain harmonic compression makes a speech signal corresponding to one pitch period, from a speech signal in a plurality of pitch periods, and outputs that signal.

The decimation makes a speech signal corresponding to one sample period from the speech signal in a plurality of sample periods during a period of unvoiced speech and outputs that signal.

The time domain harmonic expansion expands the speech signal corresponding to one pitch period, to the plurality of pitch periods existing before the compression, and the interpolation expands the speech signal corresponding to one sample period, to the plurality of sample periods existing before the compression.

In a second aspect of the present invention, there is provided a speech coding transmission equipment comprising a transmitting portion and a receiving portion. The transmitting portion, which transmits a speech signal having a compressed bandwidth, comprises a compression/expansion (C/E) control and a time domain harmonic compression. The receiving portion, which decodes the transmitted encoded signal, comprises a time domain harmonic expansion in which the decoded signal is expanded to the bandwidth before the compression, and thus reproduces the speech signal The C/E control distinguishes the periods of voiced speech and unvoiced speech. When a period of voiced speech is distinguished, the pitch period of the speech signal is extracted and output. When a period of unvoiced speech is distinguished, the sample period signal by which the speech signal is sampled is output. The time domain harmonic compression receives the pitch period data from the C/E control, obtains the speech signal corresponding to one pitch period from the speech signal in a plurality of pitch periods, receives the sample period data from the C/E control, obtains the speech signal corresponding to one sample period from the speech signal in a plurality of sample periods, and outputs the compressed speech signal. The time domain harmonic expansion receives the pitch period signal from the C/E control, expands the speech signal corresponding to one pitch period to a plurality of pitch periods, and receives the sample period signal from the C/E control and expands the speech signal corresponding to one sample period to a plurality of sample periods.

In the operation of the equipment according to the invention, first it is detected whether a speech signal is voiced speech or unvoiced speech. In a voiced period, the transmitting portion extracts the pitch period, obtains a speech signal corresponding to one pitch period from a speech signal corresponding to a plurality of pitch periods, carries out a time domain harmonic compression, and outputs a compressed speech signal. In the receiving portion, a time domain harmonic expansion is carried out and the transmitted one pitch period signal is expanded to obtain a signal having a plurality of pitch periods.

In an unvoiced period, the transmitting portion obtains a speech signal corresponding to one sample period from a speech signal corresponding to a plurality of sample periods, carries out a time domain harmonic compression and outputs a compressed signal. In the receiving portion, a time domain harmonic expansion and the transmitted speech signal corresponding to one sample period is expanded to obtain a speech signal having a plurality of sample periods.

The above-described operation enables a time domain harmonic compression and expansion of the speech signal to be carried out appropriately for both the voiced and unvoiced speeches, and thus increases the clarity of the entire transmitted decoded signal.

Other features and advantages of the invention will be apparent from the following description given with reference to the accompanying drawings.

DESCRIPTION OF THE PREFERRED EMBODIMENTS

Prior to the description of the preferred embodiments, an explanation is given of the related arts for comparison with reference to the drawings.

Figure 1:
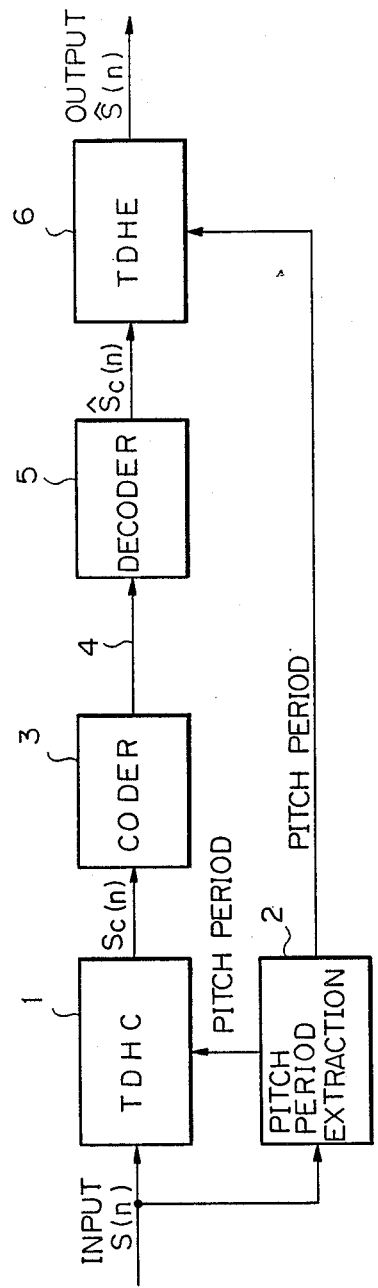
FIG. 1 is a block diagram of a speech coding transmission equipment.

FIG. 1 shows a constitution of a conventional TDHS speech coding transmission equipment. The equipment comprises a time domain harmonic compression (TDHC) unit 1, a pitch period extraction unit 2, a coder 3, a transmission line 4, a decoder 5, and a time domain harmonic expansion (TDHE) unit 6.

In FIG. 1, a pitch period of a speech signal input $S(n)$ is extracted at the pitch period extraction unit 2 and sent to the TDHC unit 1. The TDHC unit 1 compresses the input $S(n)$, in response to the input of the extracted pitch period, by the time domain harmonic scaling, and outputs a compressed signal $Sc(n)$. The compressed signal $Sc(n)$ is sent to the coder 3 and encoded by an arbitrary coding. The coded signal is then transmitted through the transmission line 4, and in the receiving portion, the decoder 5 decodes the transmitted signal and outputs a compressed received signal $\hat{S}c(n)$. The signal $\hat{S}c(n)$ is sent to the TDHE unit 6 and expanded by the TDHE into a reproduced output $\hat{S}(n)$, using the pitch period signal which is transmitted separately.

Figure 2:
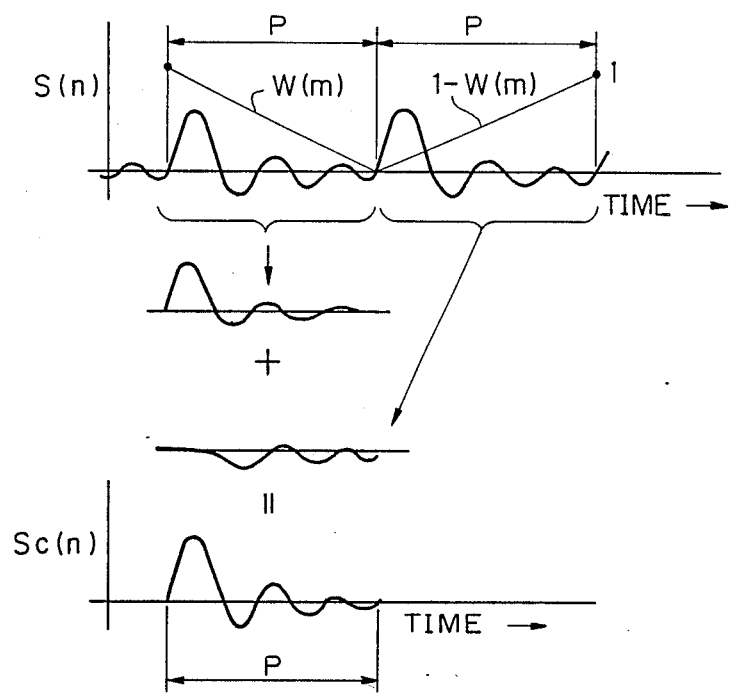
FIG. 2 is a diagram explaining a time domain harmonic compression.
Figure 3:
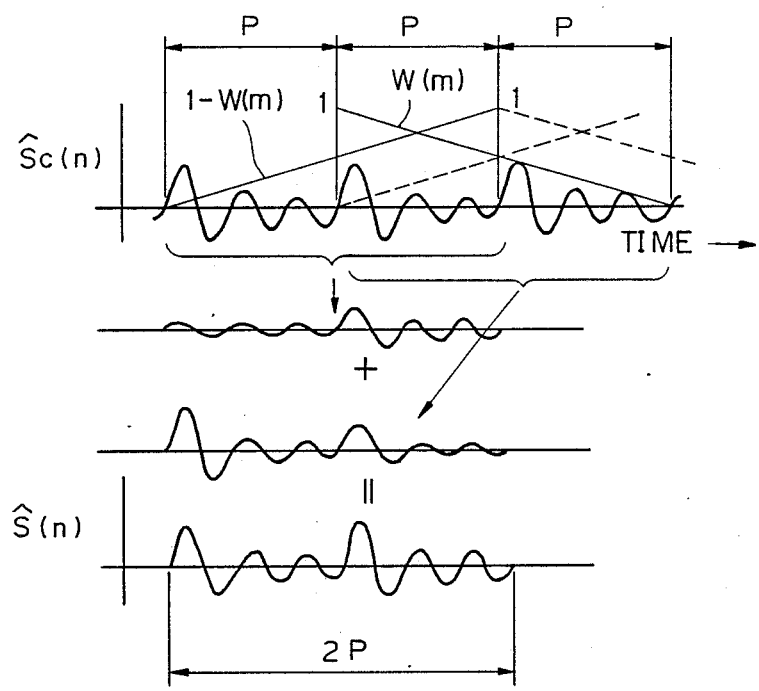
FIG. 3 is a diagram explaining a time domain harmonic expansion.

In FIGS. 2 and 3, examples of the TDHC and TDHE of the speech coding transmission equipment in FIG. 1 are explained. FIG. 2 shows the time domain harmonic compression process and FIG. 3 shows the time domain harmonic expansion process.

As shown in FIG. 2, in the time domain harmonic compression process, the input $S(n)$ is taken out for each pitch period P extracted by the unit 2, the taken out signals are weighted and arranged as one set of two periods, i.e., the first period signal is weighted by a weighting window W(m), and the second period signal is weighted by a weighting window (1−W(m)) having an opposite characteristic to that of the window W(m). The weighted first period signal is then added to the weighted second period signal, and thus a one period signal is obtained. Accordingly, a compressed signal Sc(n), the time domain of which is compressed by a ½, is generated.

On the other hand, in the time domain harmonic expansion, as shown in FIG. 3 three periods of the compressed transmitted signal Ŝc(n) are needed and the prior two periods are weighted by a weighting window (1−W(m)), and the next two periods are weighted by a weighting window W(m). The obtained two outputs are added together and two periods of the reproduced signal Ŝ(n) are obtained, and thus the bandwidth of the signal Ŝc(n) is expanded to the bandwidth existing before compression of the signal.

Figure 4:
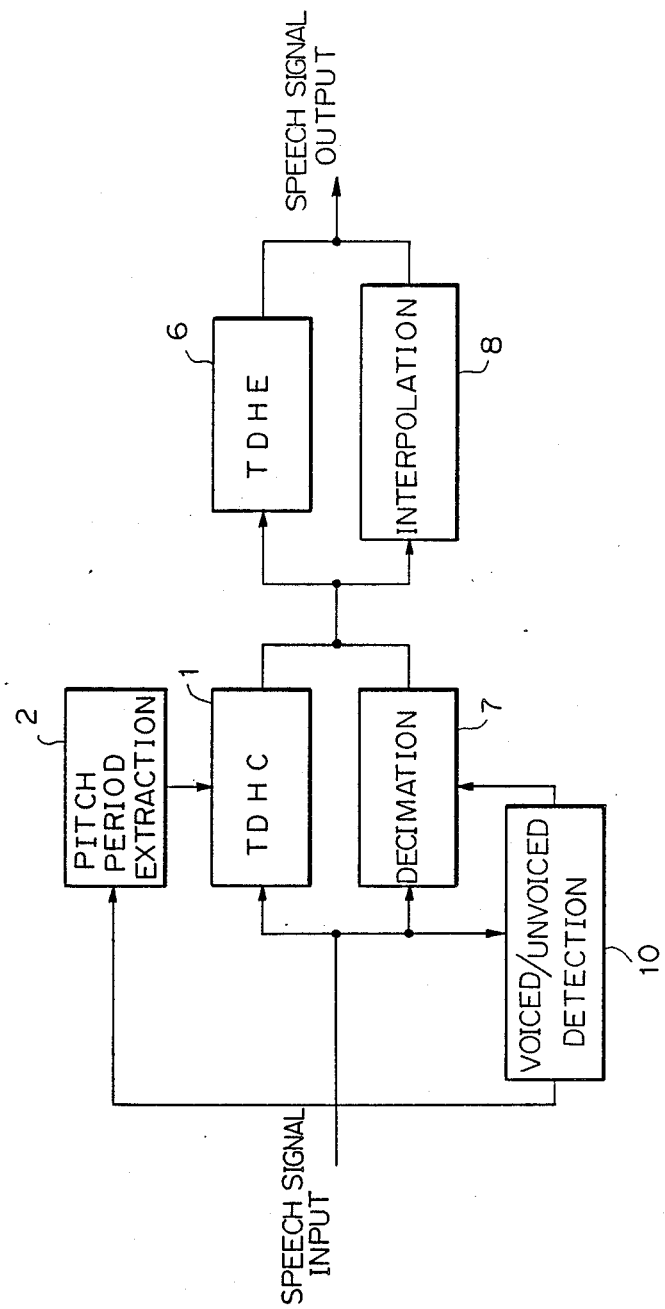
FIG. 4 is a block diagram showing a first constitution of the present invention.

FIG. 4 is a schematic block diagram of a first aspect of the speech coding transmission equipment of the present invention. This equipment comprises a TDHC 1, a pitch period extraction 2 a TDHE 6, a decimation 7, an interpolation 8, and a voiced/unvoiced detection 10. Note, the operation thereof has been described in the summary of the invention.

Figure 5:
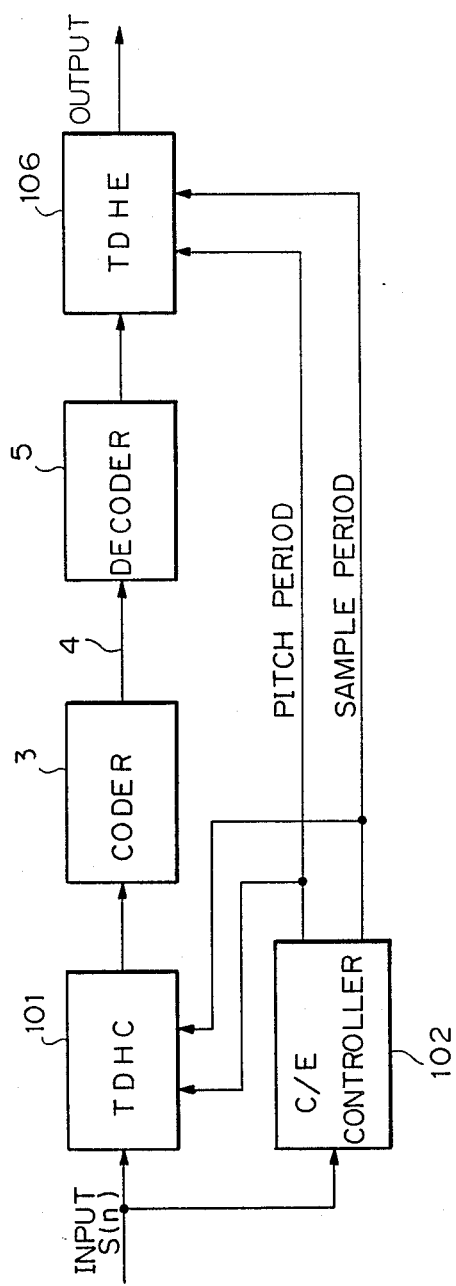
FIG. 5 is a block diagram showing a second constitution of the present invention.

FIG. 5 is a schematic block diagram of a second aspect of the speech coding transmission equipment of the present invention. This equipment comprises a TDHC 101, a compression/expansion (C/E) control 102, a coder 3, a decoder 5, and a TDHE 106. Note, the operation of this equipment has been described in the summary of the invention.

Figure 6:
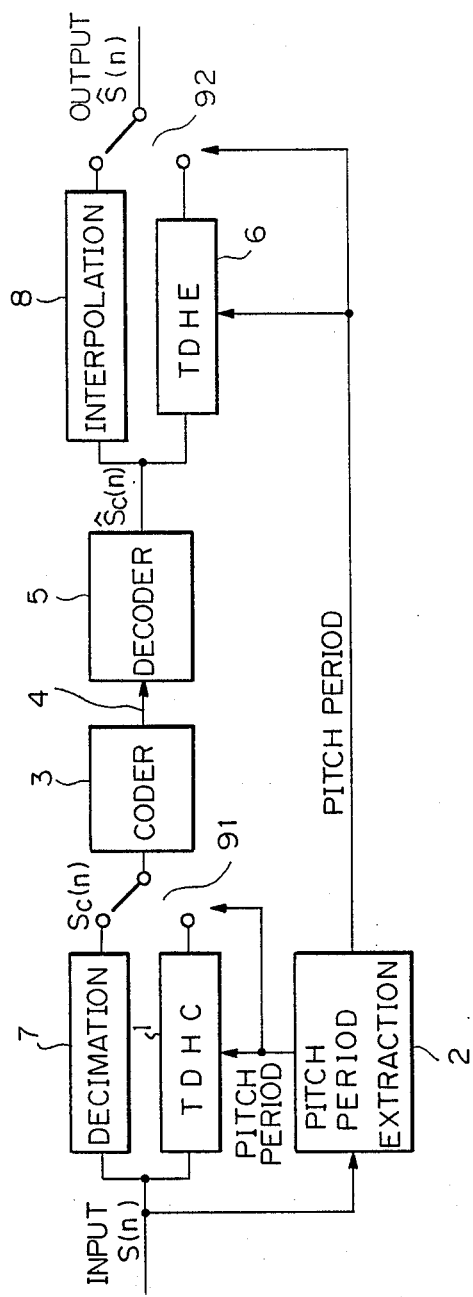
FIG. 6 is a block diagram of a first embodiment according to the present invention.

FIG. 6 shows a constitution of an equipment of a first embodiment of the present invention. In the figure, the same elements as shown in FIG. 1 are given the same reference numerals. This equipment further includes a decimation unit 7, an interpolation unit 8, and switches 91 and 92.

Figure 7:
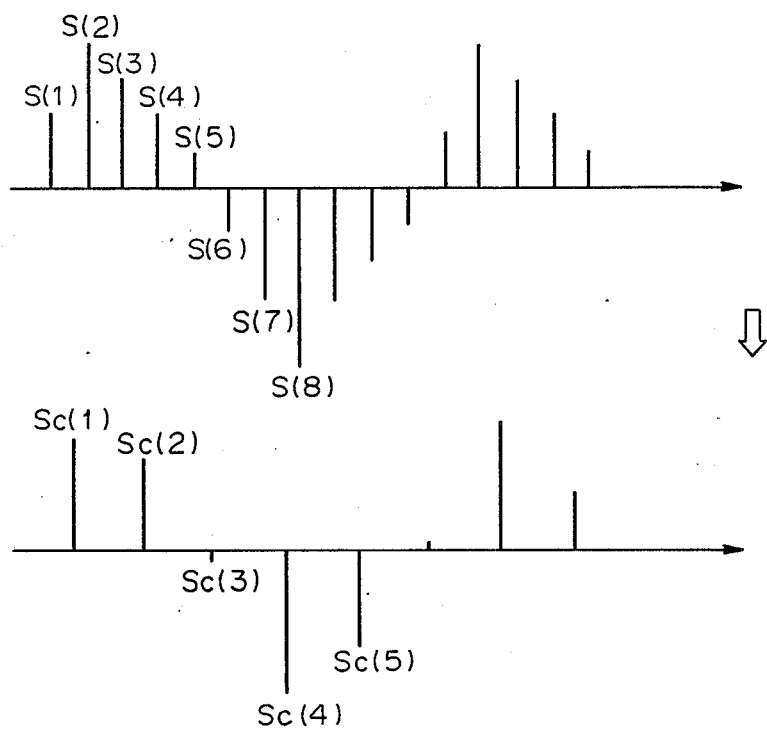
FIG. 7 is a diagram explaining a decimation process.
Figure 8:
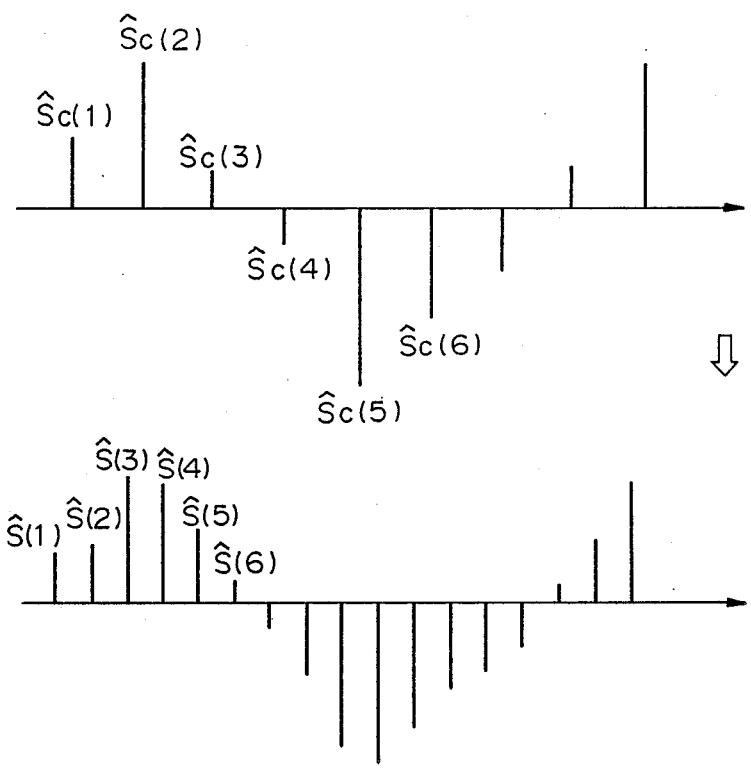
FIG. 8 is a diagram explaining an interpolation process.

FIGS. 7 and 8 explain the processes in the decimation unit 7 and the interpolation unit 8 of the embodiment of FIG. 6.

Figure 9:
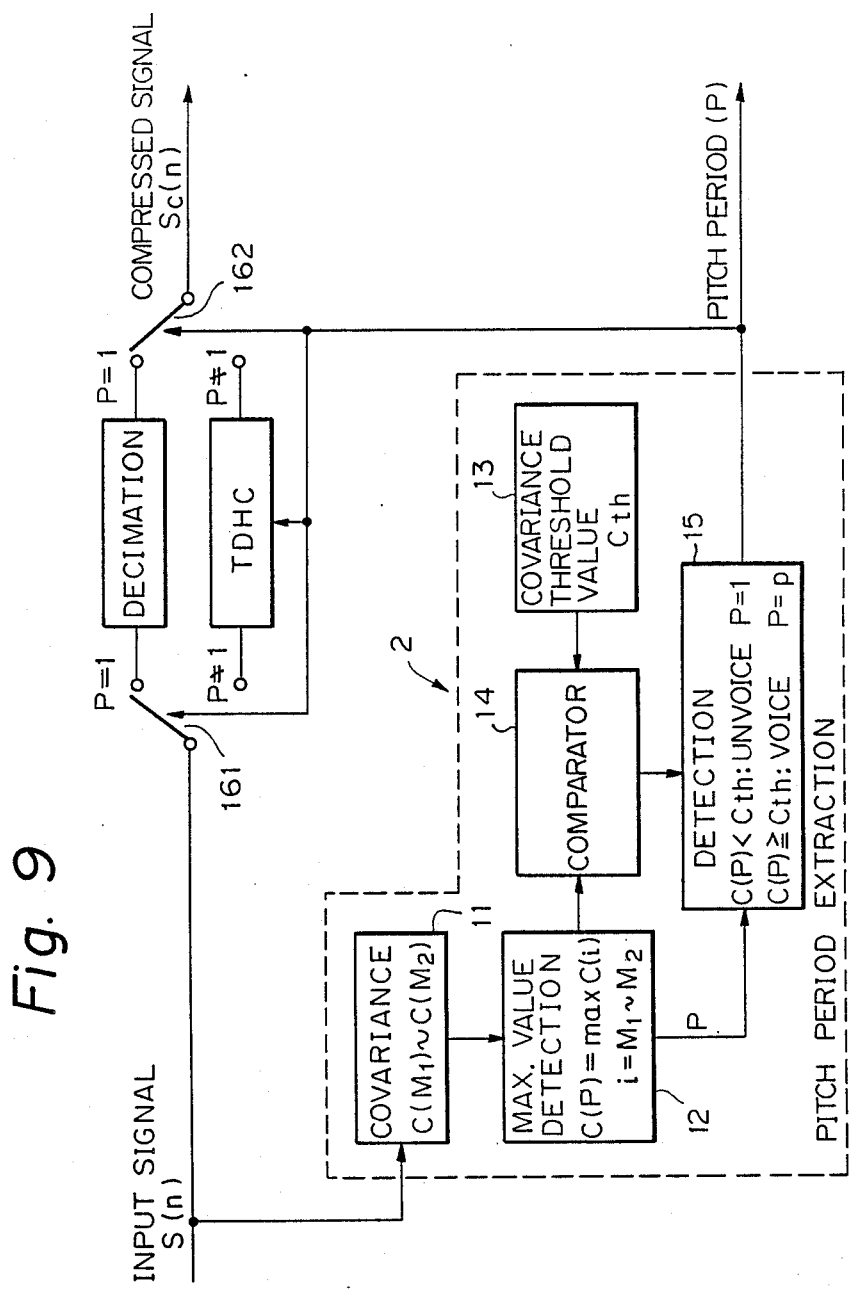
FIG. 9 is a block diagram showing a constitution of a pitch period extraction unit in FIG. 6.

FIG. 9 shows an example of the pitch period extraction unit 2 in this embodiment. The unit 2 comprises a covariance calculation unit 11, a maximum value detection unit 12, a covariance threshold value setting unit 13, a comparator 14, a detection unit 15, and switches 161 and 162.

In FIG. 6, the pitch period extraction unit 2 detects the period of the input S(n). In the period of voiced speech having a periodical characteristic of a certain length, the pitch period p is extracted as a value of the pitch period P. Where p is a number of sample periods corresponding to the pitch period. In the period of unvoiced speech having no periodical characteristic, the value 1 is output as a pitch period P.

When the pitch period P≠1, the switch 91 connects the output of the TDHC unit 1 to the coder 3 and the switch 92 connects the output of the TDHE 6 to an output line. The TDHC unit 1 carries out a compression in the time domain using the pitch period P=p, as in FIG. 1, and the TDHE unit 6 carries out an expansion in the time domain using the pitch period P=p, as in FIG. 1.

On the other hand, when the pitch period P=1, the switch 91 connects the decimation unit 7 to the coder 3 and the switch 92 connects the interpolation unit 8 to the output line, and the decimation and the interpolation are processed using the pitch period P=1. When P=1, the processing is carried out by using the sample period for the speech signal. In the decimation process, as shown in the equation (3), the mean value of the speech signal for two sample periods is calculated, and the compression signal Sc(n) corresponding to one sample period is generated. Thus, the compression signal Sc(n), which is compressed by a ½, is obtained.

$$Sc(i) = (S(2i-1) + S(2i))/2 \quad (3)$$

i=1, 2, 3, ...

FIG. 7 is a graph showing this process.

In the interpolation unit 8, the compressed transmitted signal Ŝc(i) is processed using an interpolation process and applying a speech signal having one sample period to the following equation (4) and (5). Then, a reproduction output S(n) corresponding to two sample periods is generated from the compressed transmitted signal Ŝc(n) corresponding to one sample period, and thus the bandwidth of the compressed speech signal is expanded to the width of the bandwidth before compression.

$$\hat{S}(2i) = (\hat{S}c(2i-1) + 3 \cdot \hat{S}c(2i))/4 \quad (4)$$

$$\hat{S}(2i+1) = (3 \cdot \hat{S}c(2i+2i) + \hat{S}c(2i+1))/4 \quad (5)$$

i=1, 2, 3, ...

FIG. 8 is a graph showing this process.

In this case, the extraction of the pitch period is carried out as shown in FIG. 9. Namely, the covariance calculation unit 11 receives an input S(n) and calculates the covariance C(n) defined in an equation (6) from the $M_1$ order to $M_2$ order.

$$C(n) = \Sigma S(i) \cdot S(i+n)/\sqrt{\Sigma S(i)^2 \cdot \Sigma S(i+n)^2} \quad (6)$$

Where $M_1=16$, $M_2=200$ approximately, as well known at 6.4 KHz sampling. The maximum value detection unit 12 detects the maximum value max C(i) (i=$M_1$ to $M_2$) of the C($M_1$) to C($M_2$) obtained by the above calculation. The maximum value is a covariance value C(P) wherein P is a pitch period.

The covariance value C(P) detected by this process is sent to the comparator 14 and is compared with a predetermined threshold value Cth set at the covariance threshold value setting unit 13. The comparator 14 generates outputs in response to C(P)<Cth or C(P)≧Cth. If C(P)<Cth, the periodical characteristic is weak, and thus the input signal is unvoiced speech. If C(P)≧Cth, the periodical characteristic is strong, and thus the input signal is voiced speech. Therefore, the detection unit 15 distinguishes unvoiced from voiced speech in response to the outputs of the comparator 14. In the case of voiced speech, the pitch period P=p is output, and in the case of unvoiced speech the pitch period P=1 is output; where p is the pitch period expressed as a multiple of the sample period. The value of Cth set in the covariance threshold value setting unit 13 is approximately 0.6 to 0.7, as well known.

An equipment of a second embodiment according to the present invention is now explained, after an example of a conventional unit corresponding to this embodiment is given.

Conventionally, in the TDHS type high efficiency speech coding transmission equipment, two types of frame data output from a multiplexer in the equipment are used.

Figure 10:
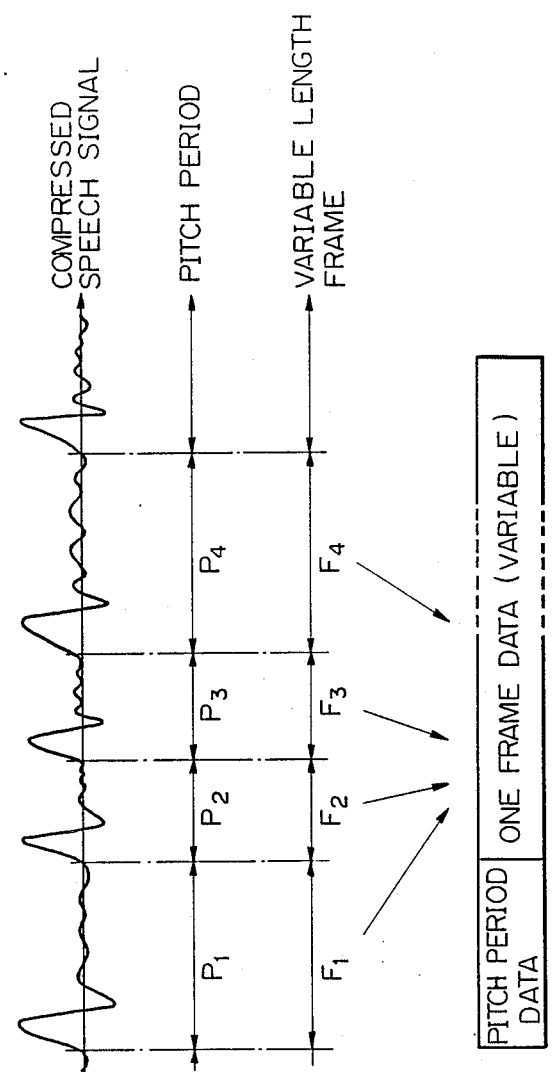
FIG. 10 is a diagram explaining a first frame constitution as an example of transmission data in the TDHS system.
Figure 11:
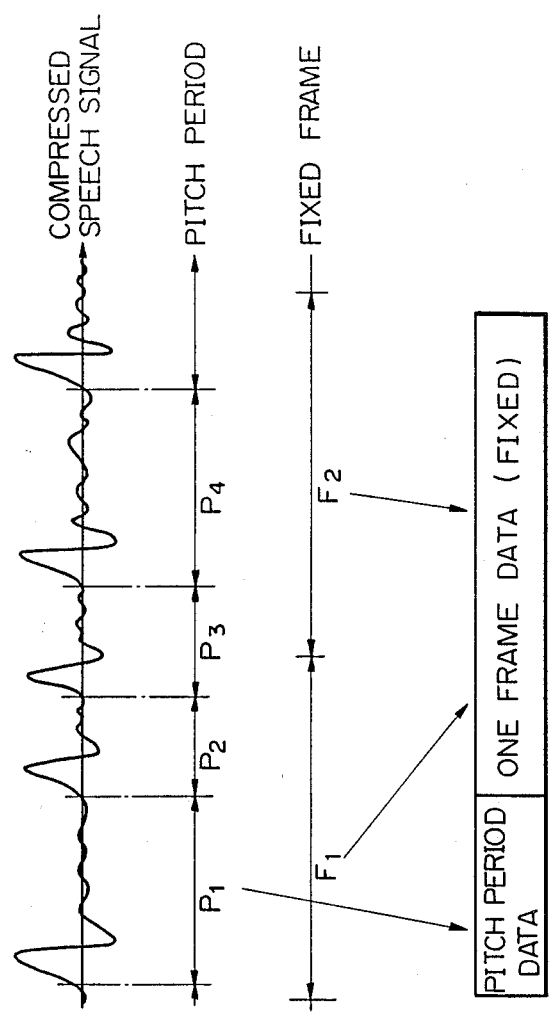
FIG. 11 is a diagram explaining a second frame constitution as another example of transmission data in the TDHS system.

FIG. 10 and FIG. 11, show the arrangements of various signals in the frame data format. In this frame format, the speech signals compressed in the time domain are located at the first part, the pitch periods are located at the second part, the frame data lengths are located at the third part, and the transmission frames are located the final part.

A first frame constitution output from the multiplexer 21 is shown in FIG. 10. One pitch period ($P_1$, $P_2$, ...) of the compressed speech signal constitutes one frame ($F_1$, $F_2$, ...), the sample data of one pitch period ($P_1$, $P_2$, ...) is the frame data, and the length of the pitch period ($P_1$, $P_2$, ...) data is attached to a header.

Figure 12:
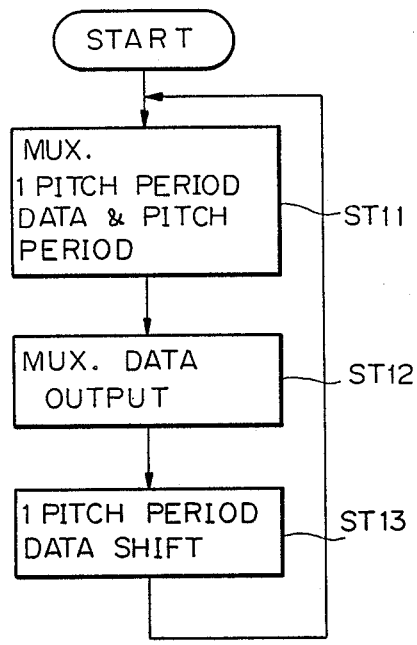
FIG. 12 is a flow chart showing an operation of a conventional multiplexer using the first frame constitution.

The operation of the multiplexer 21 constituting this frame is shown in the flow chart of FIG. 12.

In step 11 (ST 11), the multiplexer (MUX.) 21 multiplexes sample data during one pitch period from the coder 3, and the pitch period data from the pitch period extraction unit 2; in step 12 (ST 12), the multiplexed data is output; and, in step 13 (ST 13), data from the coder 3 is shifted by one pitch period.

FIG. 11 shows a second frame constitution output from the multiplexer 21. In the second frame format, the frames $F_1$, $F_2$, ... are fixed to a predetermined time, and a typical pitch period among the pitch periods $P_1$, $P_2$, $P_3$ included in the frame $F_1$, for example, $P_1$, is detected, the data of the pitch period $P_1$ is attached to the frame $F_1$ as a pitch period data of the frame data, and the frame data as shown in the fourth part is transmitted.

The typical pitch is detected and the frame made in frame $F_2$, in the same way.

Figure 13:
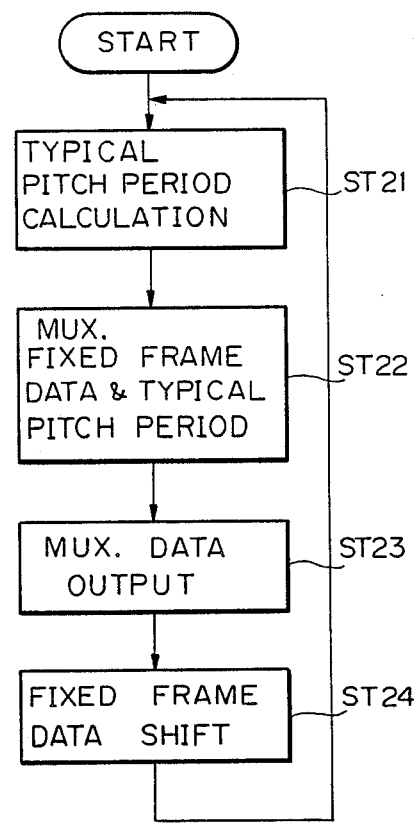
FIG. 13 is a flow chart showing an operation of a conventional multiplexer using the second frame constitution.

The operation of the multiplexer 21 constituting the frame is shown in the flow chart of FIG. 13.

In step 21 (ST 21), the typical pitch period in the frame is calculated from the sample data sent from the coder 3 in the one frame; in step 22 (ST 22), the sample data from the coder 3 and the calculated typical pitch period data is multiplexed; in step 23 (ST 23), the multiplexed data is output; and, in step 24 (ST 24), the data from the coder 3 is shifted by one frame period.

The following publication discusses the above technical process.

R. E. Crochier et al. "A 9.6 kB/S Speech Coder Using the Bell Laboratories DSP Integrated Circuit", ICASSP 82, pp. 1692–1695.

Figure 14:
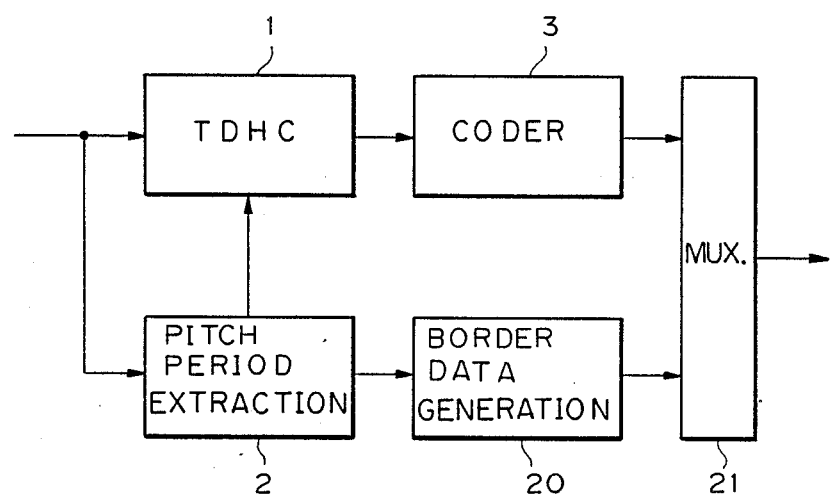
FIG. 14 is a partial block diagram showing a constitution of an equipment of a second embodiment according to the present invention.

FIG. 14 is a block diagram of the second embodiment of this invention. FIG. 14 shows only the transmitting portion of the equipment. The multiplexer 21 shown in FIG. 14 is different from that of FIG. 6; in that the equipment in FIG. 14 further comprises a border information generation unit 20.

Figure 15:
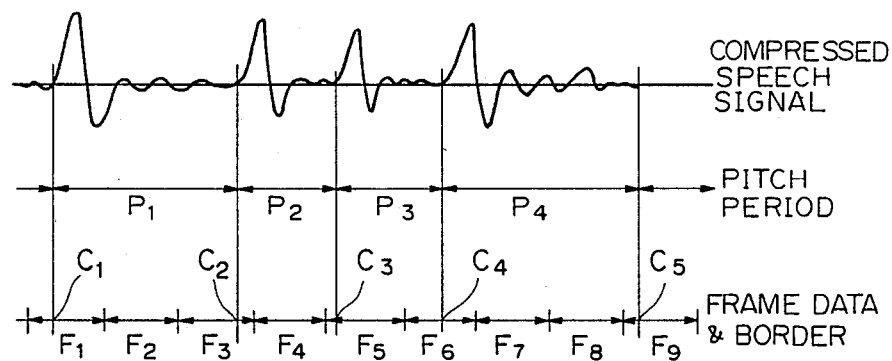
FIG. 15 is a diagram explaining a relationship between pitch periods and frames.

FIG. 15 shows a diagram explaining an operation of a second embodiment. In FIG. 15, the upper part shows compressed speech signal output from the TDHC unit 1, and the pitch periods thereof are shown by $P_1$, $P_2$, ... at the middle part of FIG. 15. The pitch period of a speech signal is generally about 67 Hz to 320 Hz, and therefore, if a speech signal is sampled by a signal of 6.4 kH, one pitch period will includes 20 to 96 samples.

In this embodiment, a sampling speech signal data consisting of a fixed length frame period shorter than the minimum one pitch period $P_2$ (20 samples) is transmitted as a one frame data. The fixed length frame period is determined as 16 samples of the transmission period, and thus when a speech signal is compressed in the time domain, as shown in the lower part of FIG. 15, the data (expressed as $F_1$, $F_2$, $F_3$, ... for simplicity) is transmitted as one frame data; where each one frame data is a speech signal data consisting of 16 samples.

The frame period is shorter than the minimum pitch period, and therefore, at most only one connecting point (border) of the pitch period of the compressed speech signal shown in the middle part of FIG. 15, can exist in one frame. The borders are shown as $C_1$ to $C_5$ in each frame in the lower part of FIG. 15. Accordingly, distinguishing data whether the border of a pitch period is included in one frame data is one bit.

In addition, since one frame data comprises 16 samples, a position distinguishing data, which shows a border position of the pitch period indicated as a sample order, may be 4 bits.

Figure 17:
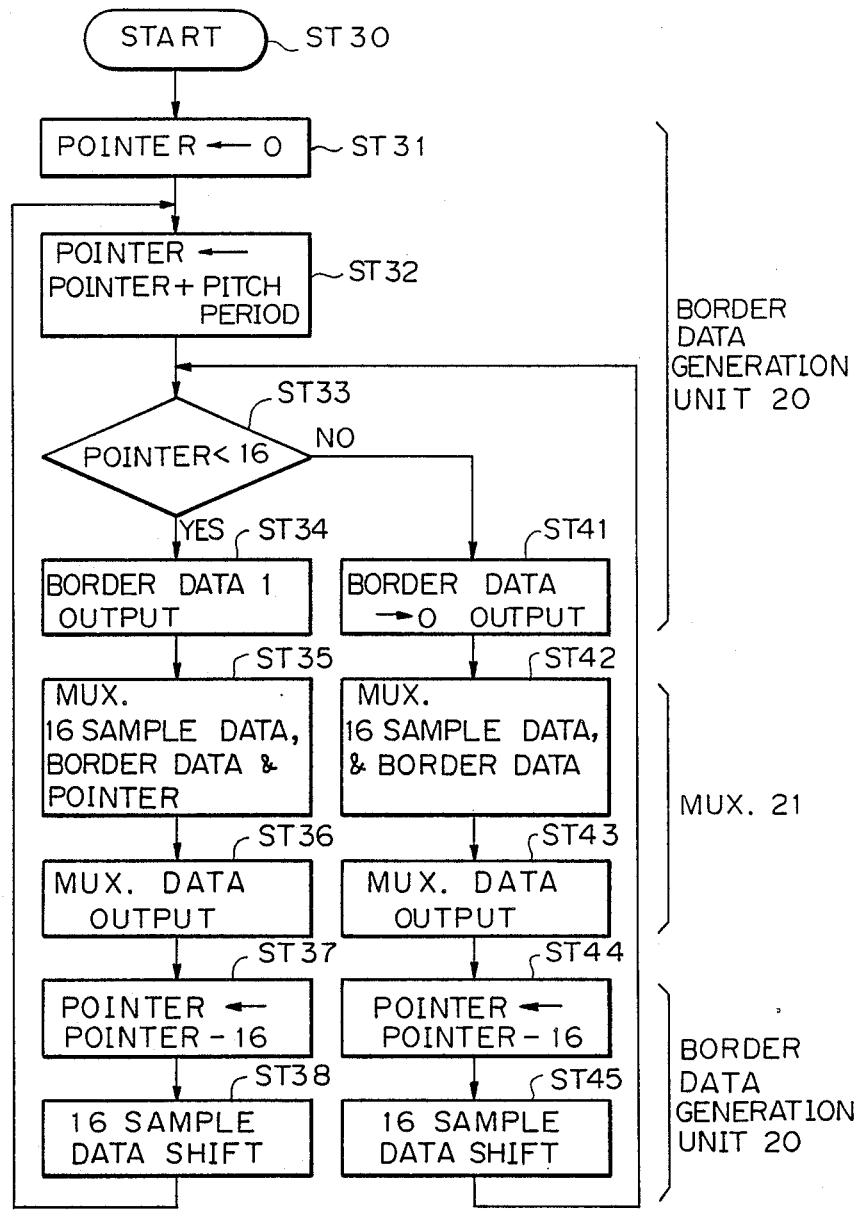
FIG. 17 is a flow chart showing an operation in a border information generation and a multiplexing process.

To constitute such a frame, as shown in FIG. 14, a border date generation unit 20 and the multiplexer 21 are provided. The operations of the border data generation unit 20 and the multiplexer 21 are shown in the flow chart of FIG. 17.

In step 30 (ST 30), the speech signal is input and the speech coding transmission equipment commences operation. Then in step 31 (ST 31), a pointer value is set to zero. The pointer value is the position distinguishing data showing a border position of the pitch period as a sample order.

In step 32 (ST 32), the pointer value and the pitch period value from the pitch period extraction unit 2 are added together, and the pointer value of the next border of the pitch period is calculated. Then, in step 33 (ST 33), the pointer value calculated at the step 32 is compared to determine whether or not the value thereof is larger than 16.

In step 34 (ST 34), if the pointer value is smaller than 16, the border data 1 is output to the multiplexer 21 from the border data generation unit 20. Then, in step 35 (ST 35), the multiplexer 21 multiplexes the data from the coder 3, which data comprises 16 samples, the border information data from the border data generation unit 20, and the pointer value. Then, in step 36 (ST 36), the multiplexed frames are output to the transmission line.

In step 37 (ST 37), the pointer value is subtracted by 16, and in step 38 (ST 38), the operation returns to step 32 after shifting the data including 16 samples from the coder 3. Then, in step 41 (ST 41), if the pointer value is larger than 16 in step 33, the border data is set to zero and the output of the border data generation unit 20 is supplied to the multiplexer 21.

In step 42 (ST 42), the multiplexer 21 multiplexes the data read out by 16 samples from the coder 3 and the border data from the border data generation unit 20 at a predetermined bit position of the frame, and in step 43 (ST 43), the multiplexed frame is output to the transmission line; in step 44 (ST 44), the pointer value is subtracted by 16; and in step 45 (ST 45), the operation is returned to step 33.

Figure 16:
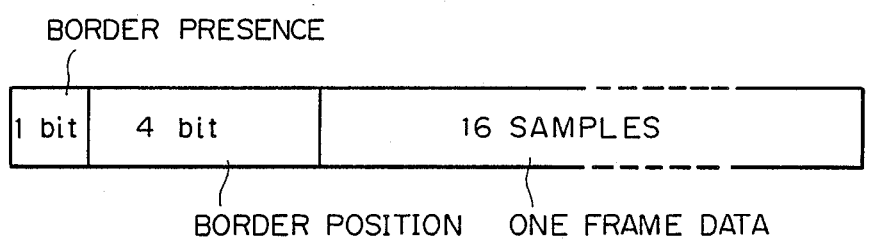
FIG. 16 is a diagram explaining a data allotment in a frame.

As mentioned above, in this embodiment, the data having a format shown in FIG. 16 is output from the multiplexer 21. The data is combined in time series to the one frame data comprising a fixed total of 16 samples of speech signal data, the border presence data which distinguishes whether the border of the pitch period is included or not in the one frame data, and the border position data which indicates the border position.

Since the border presence data is one bit, the border position data is 4 bits as mentioned above, and these both have a fixed length. Therefore, the entire coded transmission signal in FIG. 16 becomes a fixed length and the transmission of a constant information in a unit of time is possible. In addition, since the border position information of the pitch period is transmitted together, the information of the pitch period can be distinguished at the rate of 5 bits/16 samples (=1.0 kbps) at the receiver side and a time domain harmonic expansion based on a correct pitch period can be carried out.

If the border of the pitch period does not exist in the one frame data, instead of the border position data, for example, a sample data is transmitted, and thus higher quality coding signal can be transmitted.

The operation of the above-mentioned second embodiment is summarized as follows.

The border data generation unit 20 and the multiplexer 21 combines and outputs speech signal data having a predetermined fixed frame period, a fixed border presence data, and a fixed length border information data showing a position of the border of the pitch period. In this description, the predetermined fixed frame period is shorter than the minimum pitch period of the time domain harmonic compressed speech signal. The border presence data distinguishes whether or not the border of the pitch period of the compressed speech signal is included.

Therefore, since the frame data length is shorter than that of the minimum period of the pitch period of the speech signal, the frame data includes either one border of the pitch period or none. In the pitch period data in the frame, the border presence data and the border position data are included and the data is distinguished in the receiver side, and therefore, each pitch period is recognized correctly at the receiver side.

For this reason, since the frame is a fixed length, transmission jitter can be reduced at the receiving side.

As mentioned above, using this second embodiment, the frame data having a fixed length signal format is transmitted, the transmission information in a unit of time is constant, and a transmission line having an optimum transmission band with a lower redundancy may be used. Also, the pitch period, which depends on a speaker and has a time jitter, is transmitted and, accordingly, an optimum time domain harmonic expansion can be carried out by tracing the variance of the pitch period. Thus, this invention brings the advantages of an increased quality and clarity of a regenerated speech signal, in comparison with the conventional fixed frame transmission equipment.

The speech coding transmission equipment of a third embodiment according to the present invention is explained below. First, the related art for this embodiment is described.

In FIG. 14, which is a partial block diagram of the transmitting side of the above equipment, a border data generation unit 20 and a multiplexer 21 are shown. The border data generation unit 20 and the multiplexer 21 are the same as those of the second embodiment. The relationship between a frame and a pitch period is shown in FIG. 15 and a data allotment in a fixed frame is shown in FIG. 16.

Figure 18:
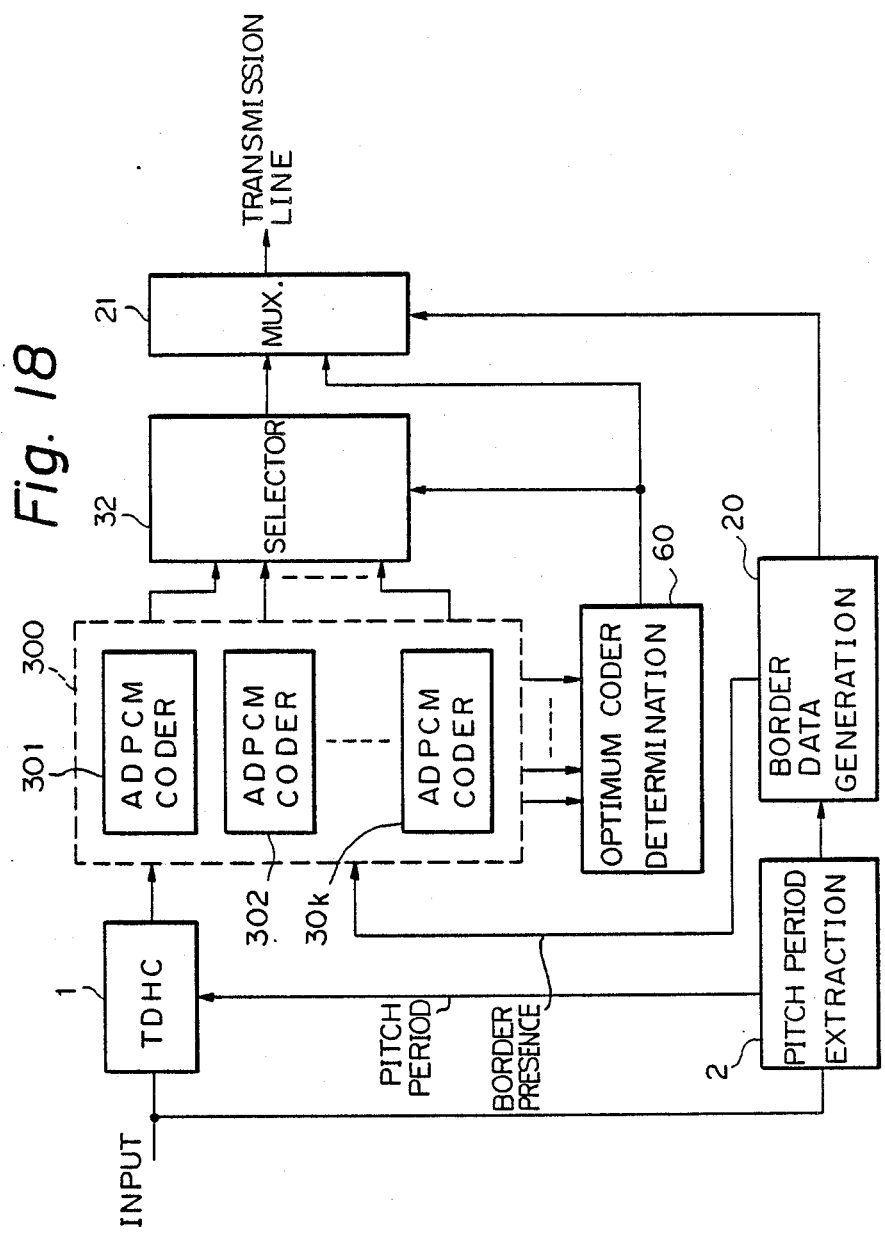
FIG. 18 is a schematic block diagram of the equipment of a third embodiment of the present invention.
Figure 19:
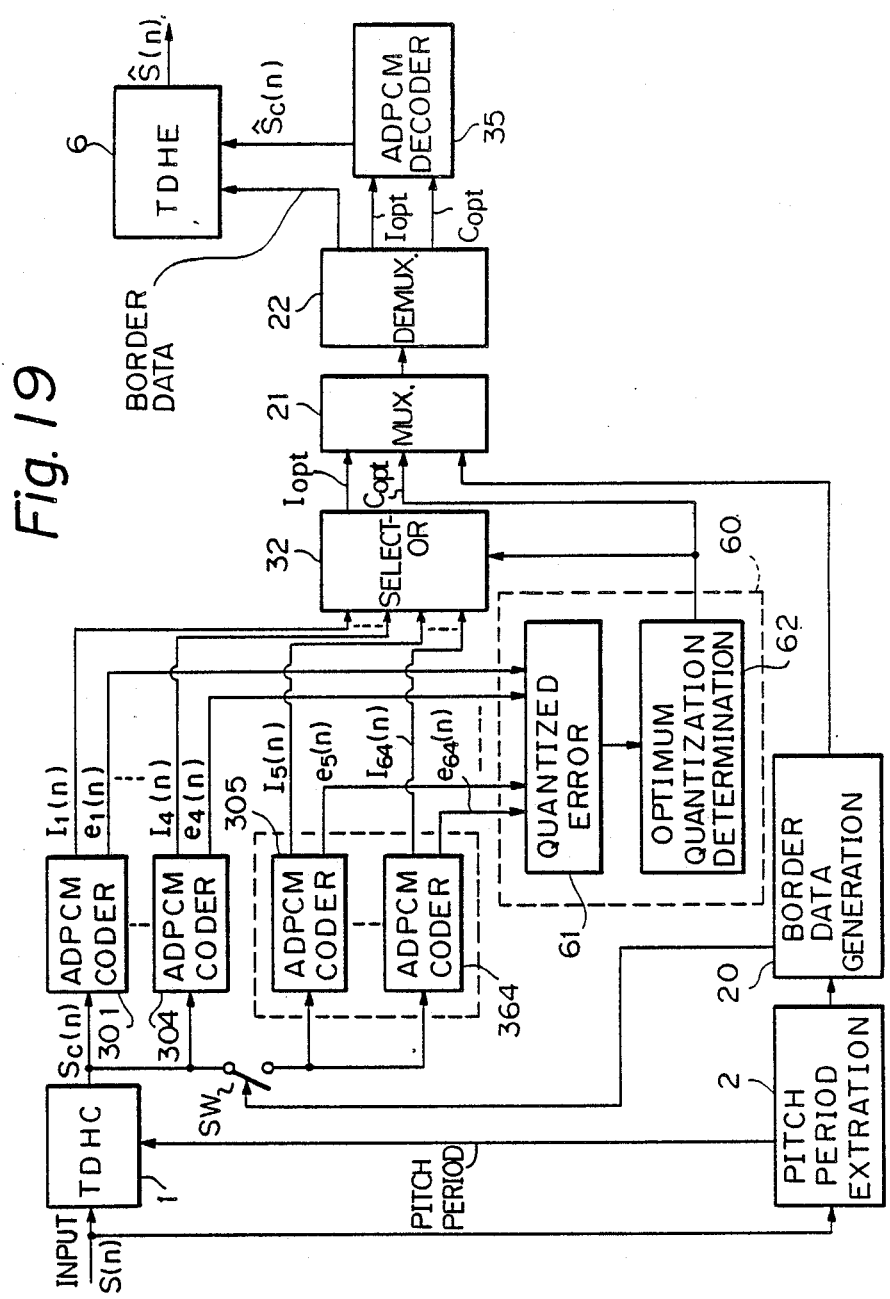
FIG. 19 is a detailed block diagram of the equipment in FIG. 18.

The third embodiment of the invention is now explained with reference to FIG. 18 and FIG. 19. FIG. 18 shows a schematic block diagram and FIG. 19 shows a detailed block diagram. In this embodiment, as a coder 3, the ADPCM (adaptive differential pulse code modulation) coder 300 is replaced. As shown in FIG. 19, the ADPCM coders 301 to 30$k$ are divided into two groups, and these groups relate to the border information of the pitch period.

Figure 20:
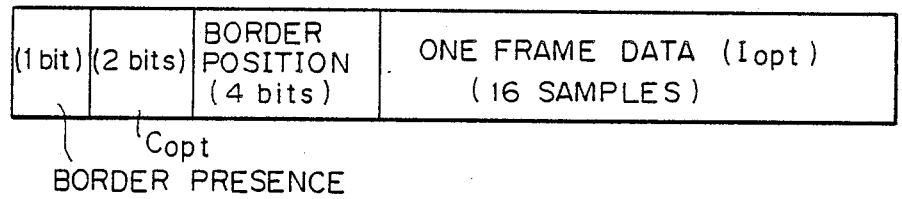
FIG. 20 and FIG. 21 are diagrams explaining frame constitutions in the equipment of FIG. 18.
Figure 21:
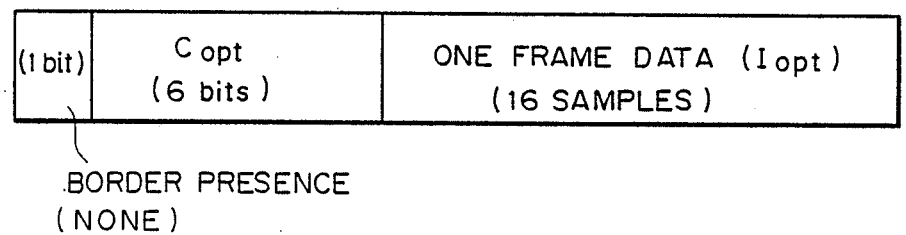

That is, as shown in FIG. 20, if the border is present, one frame data is 16 samples, and multiplexed 7 bits are added. The 7 bits are 1 bit showing the border presence, 4 bits showing the border position, and 2 bits showing the number of ADPCM coder. As shown in FIG. 21, if the border of the pitch period is not present, the border position information is not necessary, and therefore, 6 bits are allotted to the number of ADPCM coder. Thus, when the border is present as shown in FIG. 20, an optimum coder is selected from coders of $2^2=4$, and in the case of FIG. 21, an optimum coder is selected from coders of $2^6=64$. To perform the above selection, a switch (SW) is provided to connect the output of the TDHC to a first group or both the first and a second group. The first group comprises the ADPCM coders 301 to 304. The second group shown by a broken line in FIG. 19 comprises ADPCM coders 305 to 364. The first group is usually used and the second group is used only when selected by the switches.

The operation of the third embodiment is explained below. As explained with reference to FIG. 14, the border information generation unit 20 generates the border information which includes the border presence signal and the border position data based on the pitch period output from the pitch period extraction unit 2. Then, the information of one bit which relates to the border presence is supplied to the switch (SW). The switch (SW) then enables the operation of the ADPCM coders 301 to 304 or the ADPCM coders 301 to 304 and 305 to 364 in response to "1" or "0" of the border presence signal. If the border of the pitch period is present, the output of the TDHC unit 1 is applied to the ADPCM coders 301 to 304 simultaneously, and if the border is not present, the output of the TDHC unit 1 is supplied to all of the ADPCM coders 301 to 364 simultaneously.

Each coder receives the compressed signal and generates a quantized value Ii(n) of a differential signal and a quantized error $e_i(n)$; where i=1 to 4 when the border is present, and i=1 to 64 when the border is not present. Then, a quantized error power calculation unit 61 in an optimum coder determination unit 60 obtains a quantized error power in each quantized error $e_i(n)$, and outputs same to an optimum quantization determination unit 62. The optimum quantization determination unit 62 determines the smallest of the quantized error powers, and thus the ADPCM coder number $C_{OPT}$ corresponding to the smallest error is determined. The determined number is supplied to a selector 32 and the multiplexer 21.

The selector 32 determines the ADPCM coder output Ii(n) in response to the determined ADPCM coder number as an $I_{OPT}$ and the output is sent to the multiplexer 21. The multiplexer 21 changes the coding output $I_{OPT}$ into data having a fixed frame length, the period of which is shorter than the shortest pitch period as mentioned above, and then the optimum coding number $C_{OPT}$ from the optimum quantization determination unit 62 and the border information from the border data generation unit 20 are multiplexed and output to the transmission line. The border information is a border presence signal only or a border presence signal and border position data.

In the receiving side, an ADPCM decoder 35 comprises a plurality of ADPCM decoders corresponding to the ADPCM coder 300, and generates a compressed reproduced signal $\hat{S}c(n)$ receiving the signals $I_{OPT}$ and $C_{OPT}$ from a demultiplexer 22. A TDHE unit 6 receives the signal $\hat{S}c(n)$ and generates the reproduction output $\hat{S}(n)$.

In the speech coding transmission equipment according to the third embodiment, as shown in FIG. 18, the pitch period extraction unit 2 extracts the pitch period of the input speech signal and supplies the pitch period data to the TDHC unit 1 and the border data generation unit 20. The TDHC unit 1 comprises the speech signal in the time domain based on the pitch period data, and sends the signal to the ADPCM coder 300. The border data generation unit 20 generates the border presence data and the border position data in the fixed frame based on the output of the pitch period from the pitch period extraction unit 2. The ADPCM coder 300 includes a plurality of ADPCM coders 301 to 30k, and a portion of the ADPCM coders 301 to 30k or all of the ADPCM coders 301 to 30k encodes the compressed signal from the TDHC unit 1 in response to the border presence data from the border data generation unit 20. Then, the border data generation unit 20 outputs the border data to the multiplexer 21.

The optimum coder determination unit 60 determines which of the ADPCM coders among the ADPCM coders has received the compressed signal from the TDHC unit 1, and then sends the number of that ADPCM coder to the selector 32 and the multiplexer 21. As a result, the output of the optimum ADPCM coder is sent to the multiplexer 21 through the selector 32. In this place, a frame having a fixed frame length, the period of which is shorter that of the shortest pitch period, is generated. The border position data is not needed in a frame in which the border of a pitch period is not present, and the space occupied by the border position data is allotted to the coding selection data, the optimum ADPCM coder in all of the coders 301 to 30k is selected, and the number of the optimum coder is added to the frame data. On the other hand, if the border of the pitch period is present, the border position data must be located in the frame, the optimum ADPCM coder is selected out of the partial coders of all the coders 301 to 30k in the coder portion 300, and the number of the optimum coder is attached to the frame data. Thus, a fixed frame length is effectively utilized.

Using this speech coding transmission equipment of the third embodiment, the advantages when using a coding transmission having a fixed frame length smaller than that of the minimum pitch period are increased, the optimum ADPCM coder out of a plurality of ADPCM coders is selected by selecting data instead of the border position data, when not necessary, and the selecting data is sent therewith. As a result, when a pitch period is long and the border of the pitch period is not present, an adaptive predictive coding is carried out with more ADPCM coders, and thus an effective coding transmission and a reproduction of a better speech quality is achieved.

We claim:

1. Speech coding transmission equipment having a transmitting portion transmitting speech signal processed by time domain harmonic compression and encoded to produce a coded signal, and a receiving portion decoding the coded signal, and expanding and reproducing the speech signal to a bandwidth existing before compression of the speech signal, said transmitting portion comprising:
   voiced/unvoiced determination means for distinguishing whether the speech signal is in voiced periods or unvoiced periods,
   pitch period extraction means for extracting a pitch period of the speech signal during the voiced period,
   time domain harmonic compression means for obtaining and outputting a first compressed speech signal having a length of one pitch period from the speech signal included in a plurality of pitch periods,
   decimation means for obtaining and outputting a second compressed speech signal having a length of one sample period from the speech signal included in a plurality of sample periods during the unvoiced periods, said receiving portion comprising:
   time domain harmonic expansion means for expanding, in the time domain, each pitch period of the first compressed speech signal into a plurality of pitch periods of a restored speech signal, and
   interpolation means for expanding, in the time domain, each sample period of the second compressed speech signal into a plurality of sample periods of the restored speech signal.

2. Speech coding transmission equipment as set forth in claim 1, wherein said transmission portion further comprises:
   coder means for receiving and encoding the first compressed speech signal from the time domain harmonic compression means to produce encoded data,
   a multiplexer for multiplexing the encoded data output from the coder means and fixed pitch period data in a fixed frame, based on the pitch period extracted by the pitch period extraction means, and
   border data generation means for detecting a border presence in the fixed length frame and for detecting a border position based on the pitch period, the frame length being shorter than any of the pitch periods, the border presence and the border position being represented by border data multiplexed as the fixed pitch period data into the fixed frame length, by the multiplexer.

3. Speech coding transmission equipment as set forth in claim 2,
wherein the coder means comprises a plurality of adaptive differential pulse code modulation means, a portion or all of which are selected in response to detection of the border presence by the border data generation means,
wherein said speech coding transmission equipment further comprises:
   optimum coder determination means for determining an optimum coder in the plurality of adaptive differential pulse code modulation means and for outputting optimum coder data indicating same, and
   selection means for selecting the output of the optimum coder indicated by the optimum coder data, and
wherein the multiplexer further multiplexes the optimum coder data.

4. Speech coding transmission equipment as set forth in claim 3, wherein,
   when the border position of the pitch period is not detected, all of the adaptive differential pulse code modulation means are connected to the time domain harmonic compression means, and when the border position of the pitch period is detected, a portion of the adaptive differential pulse code modulation means is connected to the time domain harmonic compression means, and excess bits caused by reducing allocation of the adaptive differential pulse code modulation means allotted to the border data representing the border position of the pitch period.

5. Speech coding transmission equipment as set forth in claim 3, wherein the optimum coder determination means comprises:

quantized error power calculation means for calculating a quantized error power of each adaptive differential pulse code modulation means, and optimum quantization determination means for determining the optimum coder as an optimum quantization means.

6. Speech coding transmission equipment having a transmitting portion transmitting a speech signal processed by time domain harmonic compression and encoded to produce a coded signal, and a receiving portion decoding the coded signal, and expanding and reproducing the speech signal to a bandwidth existing before compression of the speech signal, said transmitting portion comprising:

time domain harmonic compression and expansion control means for distinguishing whether the speech signal is in a period of voiced speech or unvoiced speech, for extracting and outputting a pitch period of the speech signal during the voiced speech and for outputting a sample period signal by which the speech signal is sampled during the unvoiced speech, and time domain harmonic compression means for receiving the pitch period and sample period output from the time domain harmonic compression and expansion control means, for obtaining and outputting a first compressed speech signal having a length of one pitch period from the speech signal included in a plurality of pitch periods, and for obtaining and outputting a second compressed speech signal having a length of one sample period from the speech signal included in a plurality of sample periods, and said receiving portion comprising time domain harmonic expansion means for receiving the pitch period from the time domain harmonic compression and expansion means, for expanding each pitch period of the first compressed speech signal into a plurality of pitch periods of a restored speech signal, for receiving the sample period from the time domain harmonic compression and expansion means, and for expanding each sample period of the second compressed speech signal into a plurality of sample periods of the restored speech signal.

* * * * *

UNITED STATES PATENT AND TRADEMARK OFFICE
CERTIFICATE OF CORRECTION

PATENT NO. : 4,890,325

DATED : December 26, 1989

INVENTOR(S) : Taniguchi et al.

It is certified that error appears in the above-identified patent and that said Letters Patent is hereby corrected as shown below:

Col. 6, Equation 5, "$\hat{S}c(2i+1)=3\cdot \hat{S}c(2i+2i)+\hat{S}c(2i+1))/4$" should be --$\hat{S}c(2i+1)=3\cdot \hat{S}c(2i)+\hat{S}c(2i+1))/4$--.

Col. 8, line 19, "date" should be --data--.

Signed and Sealed this

Sixteenth Day of April, 1991

Attest:

HARRY F. MANBECK, JR.

Attesting Officer

Commissioner of Patents and Trademarks